(12) United States Patent
Jeong et al.

(10) Patent No.: US 11,217,950 B2
(45) Date of Patent: Jan. 4, 2022

(54) APPARATUS AND METHOD FOR PERFORMING ANTENNA FUNCTION BY USING USB CONNECTOR

(71) Applicant: Samsung Electronics Co., Ltd., Gyeonggi-do (KR)

(72) Inventors: Jae Cheon Jeong, Gyeonggi-do (KR); Hyun Ku Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/764,098

(22) PCT Filed: Sep. 27, 2018

(86) PCT No.: PCT/KR2018/011374
§ 371 (c)(1),
(2) Date: May 14, 2020

(87) PCT Pub. No.: WO2019/151604
PCT Pub. Date: Aug. 8, 2019

(65) Prior Publication Data
US 2020/0280152 A1    Sep. 3, 2020

(30) Foreign Application Priority Data

Jan. 30, 2018    (KR) .................. 10-2018-0011161

(51) Int. Cl.
*H01R 24/60*    (2011.01)
*H01Q 1/22*    (2006.01)

(52) U.S. Cl.
CPC ........... *H01R 24/60* (2013.01); *H01Q 1/2258* (2013.01)

(58) Field of Classification Search
CPC .......... H01R 24/60; H01R 31/06; H01R 1/10
USPC ........................................................ 439/660
See application file for complete search history.

(56) References Cited

U.S. PATENT DOCUMENTS

| | | | | |
|---|---|---|---|---|
| 4,347,487 A | * | 8/1982 | Martin | H01B 11/146 333/1 |
| 6,252,163 B1 | * | 6/2001 | Fujimori | H01R 13/6461 174/36 |
| 7,539,510 B2 | * | 5/2009 | Toyoda | H01Q 1/245 343/702 |
| 9,172,433 B2 | * | 10/2015 | Schwager | H01R 13/719 |
| 9,431,697 B2 | * | 8/2016 | Yoshino | H01Q 1/2275 |

(Continued)

FOREIGN PATENT DOCUMENTS

| | | |
|---|---|---|
| EP | 2479841 A1 | 7/2012 |
| EP | 3208722 A1 | 8/2017 |

(Continued)

OTHER PUBLICATIONS

European Search Report dated Nov. 23, 2020.

*Primary Examiner* — Alexander Gilman
(74) *Attorney, Agent, or Firm* — Cha & Reiter, LLC

(57) ABSTRACT

Disclosed is an electronic device. Other various embodiments as understood from the specification are also possible. The electronic device may include a connector electrically connected to an external device and including a first pin and a second pin and a cable including a plurality of lines. The cable may include an antenna line for receiving a broadcast signal among the plurality of lines, and the antenna line may be configured to be allocated to one pin among the first pin or the second pin.

9 Claims, 12 Drawing Sheets

(56) References Cited

U.S. PATENT DOCUMENTS

| | | | |
|---|---|---|---|
| 9,479,722 B2* | 10/2016 | Tsukahara | H04N 21/4383 |
| 9,866,270 B2* | 1/2018 | Ivanov | H04B 3/26 |
| 9,923,607 B2* | 3/2018 | Yoshino | H01Q 1/2275 |
| 10,038,290 B2* | 7/2018 | Chung | H01R 31/065 |
| 10,290,928 B2* | 5/2019 | Yoshino | H01Q 7/08 |
| 10,366,029 B2 | 7/2019 | Lee et al. | |
| 10,375,463 B1* | 8/2019 | Kocubinski | H04R 1/1016 |
| 10,387,095 B2* | 8/2019 | Yu | H04N 21/482 |
| 10,841,685 B2* | 11/2020 | Yoshino | H04B 1/16 |
| 2007/0171134 A1* | 7/2007 | Yoshino | H01Q 1/46 343/702 |
| 2008/0111749 A1* | 5/2008 | Nam | H01Q 1/243 343/702 |
| 2009/0111533 A1* | 4/2009 | Johansson | H01R 13/502 455/575.1 |
| 2010/0238088 A1* | 9/2010 | Mukai | H01Q 9/16 343/859 |
| 2010/0245185 A1* | 9/2010 | Mukai | H01Q 1/44 343/702 |
| 2012/0050133 A1* | 3/2012 | Yoshino | H01Q 1/46 343/905 |
| 2012/0189068 A1* | 7/2012 | Korner | H01Q 1/2275 375/259 |
| 2013/0009835 A1* | 1/2013 | Yoshino | H01Q 1/3291 343/792 |
| 2014/0062811 A1* | 3/2014 | Seol | H01Q 1/46 343/720 |
| 2014/0333493 A1* | 11/2014 | Yoshino | H01Q 1/50 343/713 |
| 2015/0055020 A1* | 2/2015 | Yoshino | G06F 13/385 348/706 |
| 2015/0200464 A1* | 7/2015 | Yoshino | H01Q 17/004 343/841 |
| 2015/0230049 A1* | 8/2015 | Huang | G06F 13/4022 455/456.3 |
| 2015/0270733 A1* | 9/2015 | Inha | H02J 7/342 320/103 |
| 2015/0357087 A1* | 12/2015 | Sumi | H01B 11/1083 174/118 |
| 2017/0124016 A1* | 5/2017 | Gerber | G06F 13/385 |
| 2017/0235694 A1* | 8/2017 | Lee | G06F 13/4022 710/106 |
| 2019/0013630 A1* | 1/2019 | Yoshino | H01R 13/6598 |

FOREIGN PATENT DOCUMENTS

| | | |
|---|---|---|
| JP | 2012-238946 A | 12/2012 |
| JP | 2014-183512 A | 9/2014 |
| KR | 10-2003-0004817 A | 1/2003 |
| KR | 10-2006-0083630 A | 7/2006 |
| KR | 10-2007-0023209 A | 2/2007 |
| KR | 10-2014-0027227 A | 3/2014 |
| KR | 10-1684174 B1 | 12/2016 |
| KR | 10-2017-0096510 A | 8/2017 |

* cited by examiner

APPARATUS AND METHOD FOR PERFORMING ANTENNA FUNCTION BY USING USB CONNECTOR

CLAIM OF PRIORITY

This application is a National Phase Entry of PCT International Application No. PCT/KR2018/011374, which was filed on Sep. 27, 2018 and claims a priority to Korean Patent Application No. 10-2018-0011161, which was filed on Jan. 30, 2018, the contents of which are incorporated herein by reference.

TECHNICAL FIELD

Embodiments disclosed in this specification relate to an apparatus and a method that perform an antenna function using a Universal Serial Bus (USB) connector.

BACKGROUND ART

An electronic device may provide a user with a broadcast service through an antenna capable of receiving a broadcast signal such as frequency modulation (FM) or digital multimedia broadcasting (DMB).

DISCLOSURE

Technical Problem

An antenna circuit (or an antenna line) may be connected to at least one pin among a plurality of pins included in the connector of an external device. However, when a signal other than a broadcast signal is transmitted through the connector through which an electronic device and the external device are connected to each other, noise components such as electromagnetic interference (EMI) may be generated, thereby reducing the performance of the antenna line.

Various embodiments of the disclosure are to propose an apparatus and a method that prevent the performance of a broadcast antenna line included in the external device from being degraded.

Technical Solution

According to an embodiment disclosed in the specification, an electronic device may include a connector electrically connected to an external device and including a first pin and a second pin and a cable including a plurality of lines. The cable may include an antenna line for receiving a broadcast signal among the plurality of lines, and the antenna line may be configured to be allocated to one pin among the first pin or the second pin.

According to an embodiment disclosed in the specification, an electronic device may include a connector connected to an external device, a first interface module processing a voice signal or a display port (DP) protocol-based signal, a second interface module processing a broadcast signal, a processor, and a switch positioned between the first and second interface modules and the connector. The processor may be configured to receive control information of the external device through the connector, identify that the external device supports an antenna function for the broadcast signal, based on the control information, to control the switch such that the connector is connected to the second interface module, and to receive the broadcast signal from the external device through the connector.

According to an embodiment disclosed in the specification, an electronic device may include a USB C-TYPE connector connected to an external device, a first interface module processing a voice signal or a DP protocol-based signal, a second interface module processing a broadcast signal, a processor, and a switch positioned between the first and second interface modules and the USB C-TYPE connector. The processor may be configured to receive control information of the external device through the USB C-TYPE connector, identify that the external device supports an antenna function for the broadcast signal, based on the control information, to control the switch such that the USB C-TYPE connector is connected to the second interface module, and to receive the broadcast signal from the external device through the USB C-TYPE connector.

Advantageous Effects

According to various embodiments disclosed in this specification, an electronic device may provide a broadcast service to a user by receiving a broadcast signal through a USB C-TYPE connector.

According to various embodiments disclosed in this specification, the electronic device may prevent the performance of an antenna line from being degraded, by adaptively connecting the lines connected to pins of USB C-TYPE depending on whether an external device is inserted.

Besides, a variety of effects directly or indirectly understood through the disclosure may be provided.

MODE FOR INVENTION

Hereinafter, various embodiments of the disclosure will be described with reference to accompanying drawings. However, those of ordinary skill in the art will recognize that modification, equivalent, and/or alternative on various embodiments described herein can be variously made without departing from the scope and spirit of the disclosure.

Figure 1:
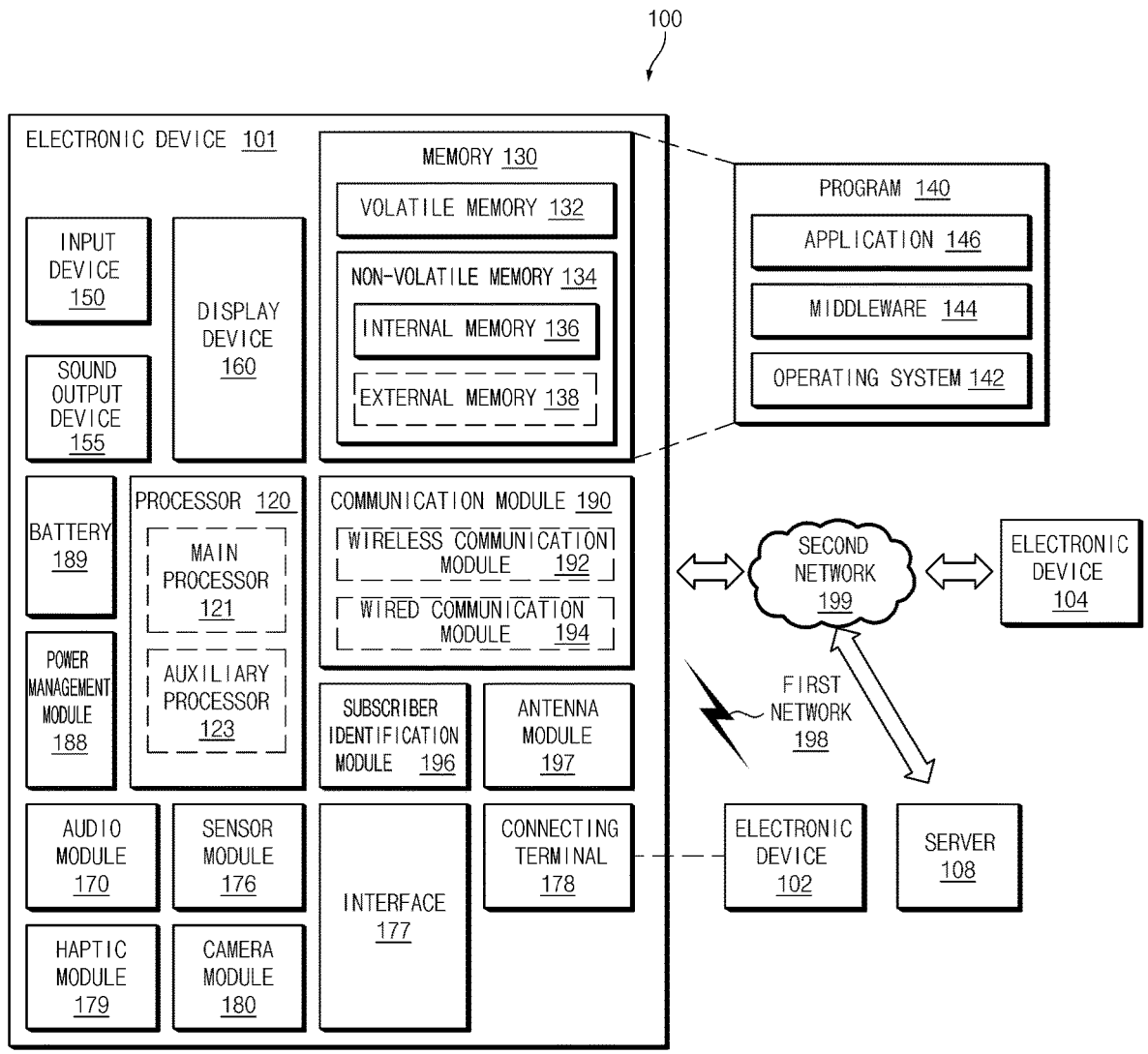
FIG. 1 is a block diagram of an electronic device in a network environment, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
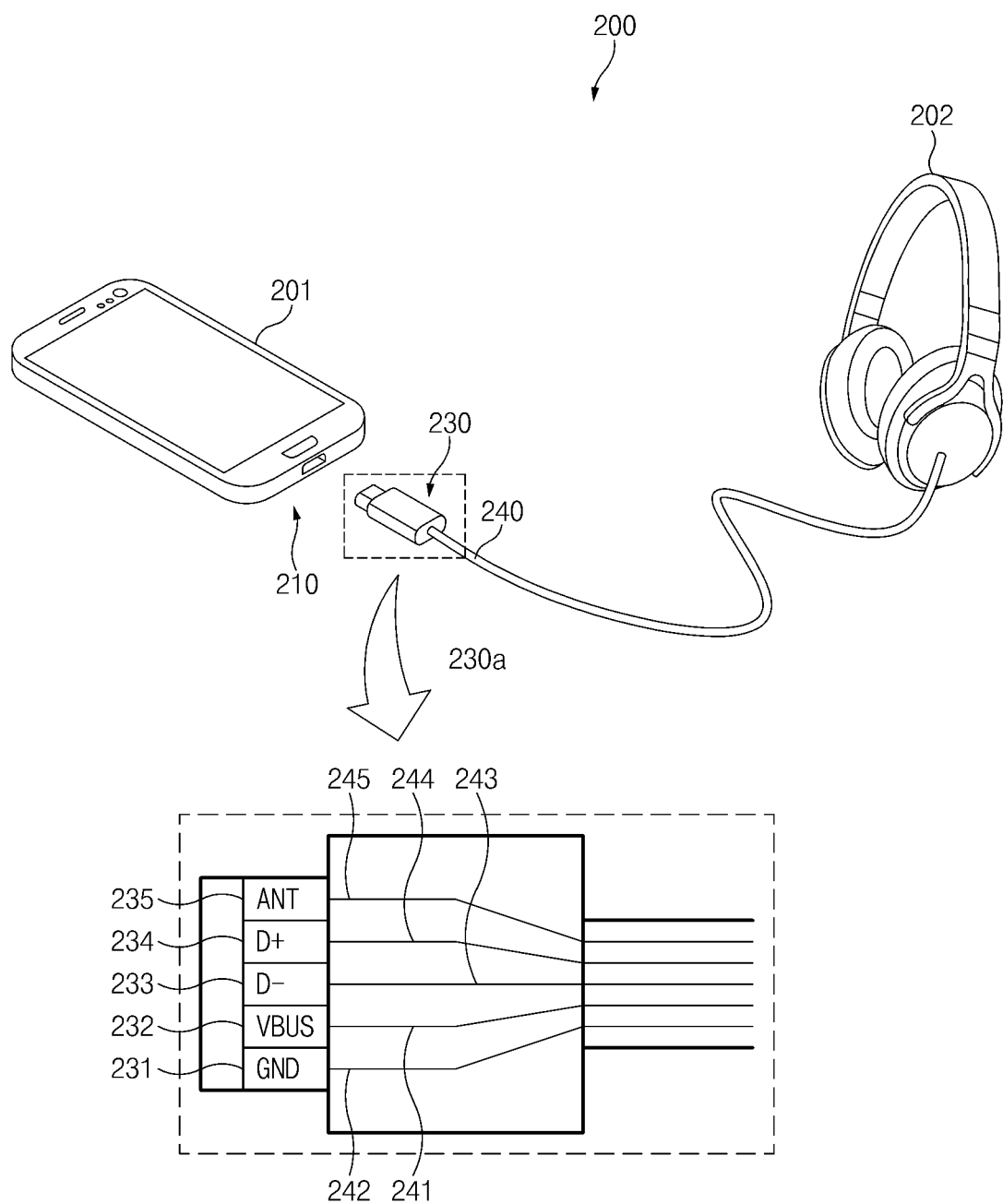
FIG. 2 illustrates a configuration of a connector of an external device including an antenna line according to various embodiments.

FIG. 2 illustrates a configuration of a connector of an external device including an antenna line according to various embodiments.

Referring to FIG. 2, a network 200 (e.g., the network 100 in FIG. 1) may include an electronic device 201 (e.g., the electronic device 101 in FIG. 1) and an external device 202. The electronic device 201 and the external device 202 may be connected to the external device 202 through a connector 210 (e.g., the connecting terminal 178 in FIG. 1) and a connector 230.

According to an embodiment, the electronic device 201 may be a portable electronic device such as a smart phone, a tablet PC, or a wearable device. According to an embodiment, the electronic device 201 may transmit a signal (or data) to the external device 202, using a USB protocol defined by the USB standard organization (USB.org) or a protocol (referred to as "non-USB protocol") other than the USB protocol. For example, the USB protocol may include version 2.0 or version 3.x (e.g., version 3.0 or higher). For example, the non-USB protocol may include a display port (DP) protocol defined by a video electronics standards association (VESA), and a universal flash storage (UFS) protocol defined by a joint electron device engineering council (JEDEC).

According to an embodiment, the electronic device 201 may transmit and receive signals to and from the external device 202 through the connector 210. For example, the connector 210 may include a USB C-TYPE connector defined by a USB standard organization. According to an embodiment, the electronic device 201 may transmit a voice signal generated through the audio module (e.g., the audio module 170 of FIG. 1) of the electronic device 201 to the external device 202 or may receive a voice signal received to an input device (e.g., a microphone) of the external device 202. For another example, the electronic device 201 may receive a broadcast signal through an antenna line 245 included in the external device 202. For example, the broadcast signal may include a FM signal or a DMB signal.

According to an embodiment, the external device 202 may mean an accessory capable of performing various functions of the electronic device 201. For example, the external device 202 may include a docking device connected to the electronic device 201 through an earphone, a headset, a data link cable, or the connector 230. For example, when the external device 202 includes an earphone or a headset, the external device 202 may receive a voice signal from the electronic device 201 through the connector 230 to output the voice signal through a speaker or may transmit the voice signal received by an input device of the external device 202 to the electronic device 201. For another example, the external device 202 may transmit a broadcast signal (e.g., a FM or DMB signal) to the electronic device 201.

According to an embodiment, the external device 202 may transmit a signal to the electronic device 201 through a cable 240 and the connector 230. For example, the connector 230 may include a USB C-TYPE. Referring to reference number 230a illustrating the enlarged one side of the connector 230 and the cable 240, the connector 230 may include a plurality of pins 231, 232, 233, 234, and 235 connected to lines 241, 242, 243, 244, and 245 of the cable 240. FIG. 2 illustrates the connector 230 including D pins 233 and 234, a VBUS pin 232, a GND pin 231, and an antenna (ANT) pin 235, but the embodiment is not limited to the pins illustrated in FIG. 2. The connector 230 may further include USB C-TYPE pins defined by the USB standard organization. According to an embodiment, the pins 231, 232, 233, 234, and 235 may support different functions. Specific examples of functions supported by the pins 231, 232, 233, and 234 other than the antenna pin 235 are described in detail in FIG. 3.

According to an embodiment, the antenna line 245 connected to the antenna pin 235 may receive a broadcast signal. According to an embodiment, the antenna line 245 may include an antenna line, an antenna lane, an antenna wire, and a printed circuit board (PCB) circuit. The external device 202 may transmit the signal received through the antenna line 245 to the electronic device 201 through the antenna pin 235. According to an embodiment, the antenna pin 235 may mean one pin of USB C-TYPE pins. For example, the antenna pin 235 may include a GND pin, a TX+/− pin, an RX+/− pin, or an SBU pin.

Figure 3:
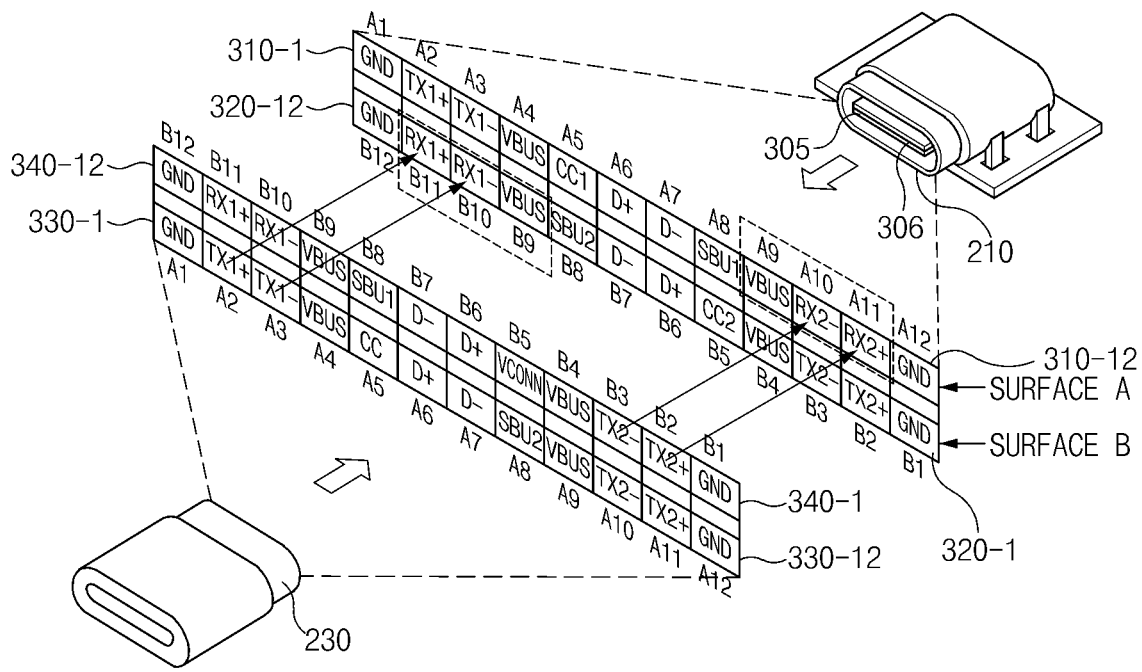
FIG. 3 illustrates the configuration of a USB C-TYPE connector according to various embodiments.

FIG. 3 illustrates the configuration of a USB C-TYPE connector according to various embodiments.

Referring to FIG. 3, the electronic device 201 may be electrically connected to the external device 202 through the connector 210. The exterior appearance of the connector 210 of the electronic device 201 may be formed such that the connector 230 of the external device 202 is capable of being inserted in either the forward or reverse direction (hereinafter, referred to as reversibility), and a contact substrate 305 may be formed inside the connector 210. Twelve pins 310-1, 310-2, . . . , and 310-12 may be formed on the first surface (e.g., surface A) corresponding to the forward direction of the contact substrate 305; twelve pins 320-1, 320-2, . . . , and 320-12 may be formed on the second surface (e.g., surface B) corresponding to the reverse direction. A mid-plate 306 having electrically conductive features may be formed inside the contact substrate 305. The twelve pins 330-1, 330-2, . . . , and 330-12 may be formed on the first surface (e.g., surface A) of the connector 230 such that the connector 230 of the external device 202 is in contact with the twelve pins 310-1, 310-2, . . . , and 310-12 formed on the first surface (e.g., surface A) of the contact substrate 305. The twelve pins 340-1, 340-2, . . . , and 340-12 may be formed on the second surface (e.g., surface B) of the connector 230 such that the connector 230 is in contact with the twelve pins 320-1, 320-2, . . . , and 320-12 formed on the second surface (e.g., surface B) of the contact substrate 305. The number of pins formed on the connector 230 of the external device 202 may vary depending on the type of the external device 202. The CC pin of the external device 202 may be one or two. For example, the order of arrangement of the twelve pins formed on the first surface (e.g., surface A) may be the same as the order of arrangement of the twelve pins formed on the second surface (e.g., surface B) such that the connector 230 of the external device 202 is capable of being inserted in either direction of the first surface or the second surface. A user may plug the connector 230 of the external device 202 into the connector 210 of the electronic device 201 in a state where the connector 230 of the external device 202 is rotated by 180 degrees, due to such the structure.

According to an embodiment, the arrangement of the pins formed on the first surface (e.g., surface A) and the second surface (e.g., surface B) of the contact substrate 305 is illustrated in Table 1 below.

TABLE 1

| Pin No. | Pin No. | SignalName | Function | Note |
|---|---|---|---|---|
| A1 | B1 | GND | Power | Ground (e.g., Support for 60 W minimum (combined with all VBUS pins)) |
| A2 | B2 | TX1+ or SSTXp1 | USB 3.1 or Alternate Mode | Super speed TX positive (e.g., 10 Gb/s differential pair with TX1−) |
| A3 | B3 | TX1− or SSTXn1 | USB 3.1 or Alternate Mode | Supper speed TX negative (e.g. 10 Gb/s differential pair with TX1+) |
| A4 | B4 | VBUS | Power | USB cable charging power (e.g., Support for 60 W minimum (combined with all VBUS pins)) |
| A5 | B5 | CC1, CC2 | CC or VCONN | Identification terminal |
| A6 | B6 | D+ | USB 2.0 | +line of the differential bi-directional USB signal |
| A7 | B7 | D− | USB 2.0 | −line of the differential bi-directional USB signal |
| A8 | B8 | SBU1, SBU2 | Alternate Mode | Side band Use: additional purpose pin (e.g., Audio signal, display signal, or the like) |

TABLE 1-continued

| Pin No. | Pin No. | SignalName | Function | Note |
|---|---|---|---|---|
| A9 | B9 | VBUS | Power | USB cable charging power (e.g., Support for 60 W minimum (combined with all VBUS pins) |
| A10 | B10 | RX2− or SSRXn2 | USB 3.1 or Alternate Mode | Super speed RX negative (e.g., 10 Gb/s differential pair with RX2+) |
| A11 | B11 | RX2+ or SSRXp2 | USB 3.1 or Alternate Mode | Super speed RX negative (e.g., 10 Gb/s differential pair with RX2−) |
| A12 | B12 | GND | Power | Ground (e.g., Support for 60 W minimum (combined with all VBUS pins)) |

Referring to Table 1, it illustrates the description of the pins of the connector 210 or the connector 230 of the USB C-TYPE according to various embodiments. The connector 210 of the USB C-TYPE may include 12 pins (terminals) on each of the first surface (e.g., surface A) and the second surface (e.g., surface B). The 12 pins of the first surface (e.g., surface A) may include GND (A1), TX1 (A2), TX1− (A3), VBUS (A4), CC1 (A5), D+ (A6), D− (A7), SBU1 (A8), VBUS (A9), RX2− (A10), RX2+ (A11), and GND (A12) pins. The 12 pins of the second surface (e.g., surface B) may include GND (B1), TX2+ (B2), TX2− (B3), VBUS (B4), CC2 (or VCONN) (B5), D+ (B6), D− (B7), SBU2 (B8), VBUS (B9), RX1− (B10), RX1+ (B11), and GND (B12) pins.

According to an embodiment, 24 pins formed on the first and second surfaces may be arranged as a mirrored configuration due to the reversibility of the connector 210 of the USB C-TYPE. The user may rotate and plug the connector 230 of the external device 202 into the connector 210 of the electronic device 201 by 180 degrees due to such the structure. In this case, symmetrical pins may not be used together. For example, when the TX1+ pin and the TX1− pin are used, the TX2+ pin, the TX2− pin, the RX2+ pin, and the RX2− pin may not be used; when the RX1+ pin and RX1− pin are used, the RX2+ pin, RX2− pin, TX2+ pin, and TX2− pin may not be used. The connector 210 may include the mid-plate 306 having electrical conductivity inside the contact substrate 305. There are 24 pins (e.g., 12 pins on the first surface and 12 pins on the second surface) on the contact substrate 305, and the pins may not be used simultaneously. Which pin of the pins is to be used may be determined depending on the connection state (e.g., direction) between the connector 210 and the connector 230.

According to an embodiment, the CC1 pin 310-5 formed on the first surface (e.g., surface A) of the contact substrate 305 and the CC2 pin 320-5 formed on the second surface (e.g., surface B) thereof may be used to grasp the purpose of the external device 202 connected to the connector 210. For example, when the CC1 pin 310-5 of the electronic device 201 is connected to the CC pin 330-5 of the external device 202 in a state where the connector 230 of the external device 202 is plugged into the connector 210 of the electronic device 201 such that the first surface (e.g., surface A) of the connector 230 of the external device 202 faces upwardly, the CC2 pin 320-5 of the electronic device 201 may be used to supply power (VCONN) for the IC for recognizing the external device 202. When the CC2 pin 320-5 of the electronic device 201 is connected to the CC pin 330-5 of the external device 202 in a state where the connector 230 of the external device 202 is plugged into the connector 210 of the electronic device 201 such that the first surface (e.g., surface A) of the connector 230 of the external device 202 faces downwardly, the CC1 pin 310-5 of the electronic device 201 may be used to supply power (VCONN) for the IC for recognizing the external device 202. The CC pins 310-5 and 320-5 may be connected to CC or VCONN of the external device 202; the CC pins 310-5 and 320-5 of the electronic device 201 may support CC and VCONN. According to an embodiment, the electronic device 201 and the external device 202 may transmit and receive control information through the CC pins. For example, the control information may include information indicating whether the external device 202 supports an antenna function for a broadcast signal and information for making a request for a broadcast signal.

According to an embodiment, the SBU1 pins 310-8 and 340-8 and the SBU2 pins 320-8 and 330-8 may be low-speed signal pins allocated to be used in an alternate mode. Before the electronic device 201 and the external device 202 transmit and receive power, the negotiation in the alternate mode between the electronic device 201 and the external device 202 may be required. According to an embodiment, the electronic device 201 may operate in a legacy mode through the SBU pins. For example, the legacy mode may include the transmission and reception of a signal supporting DP protocol, the transmission and reception of a voice signal, or a moisture recognition function. The voice signal transmitted and received through the SBU pins may include an analog signal. When the antenna line 245 of the external device 202 is allocated to the SBU pin of the connector 230, the electronic device 201 may operate in a broadcast mode through the SBU pins. In the broadcast mode, the electronic device 201 may receive a broadcast signal from the external device 202.

According to an embodiment, D+ pins 310-6, 320-6, 330-6, and 340-6 and D− pins 310-7, 320-7, 330-7, and 340-7 may be used to transmit and receive voice signals. Through the D+ pin or the D− pin, the electronic device 201 may transmit a voice signal to the external device 202 or may receive a voice signal from the external device 202. The voice signal transmitted and received through the D pins may include a digital signal.

According to an embodiment, when the electronic device 201 receives a signal (or data) from the external device 202 connected to the connector 210, the pins of VBUS (A4), RX2− (A10), RX2(A11), and GND (A1, A12) of the first surface (e.g., surface A) may be connected to VBUS (A4), TX1+ (A2), TX1− (A3), and GND (A1, A12) pins of the first surface (e.g., surface A) of the connector 230 of the external device 202 or may be connected to VBUS (B4), TX2+ (B2), TX2− (B3), and GND (A1, A12) pins of the second surface (e.g., surface B).

According to an embodiment, the antenna line (e.g., the antenna line 245 in FIG. 2) receiving a broadcast signal may be connected to the GND pin (one GND pin of the two GND pins), the TX+ pin, the TX− pin, the SBU pin, the RX− pin, or the RX+ pin of the first surface or the second surface of the connector 230 of the external device 202. The electronic device 201 may receive a broadcast signal through the pin of the connector 230 of the external device 202, to which the antenna line is connected, and the corresponding pin of the connector 210 of the electronic device.

Figure 4A:
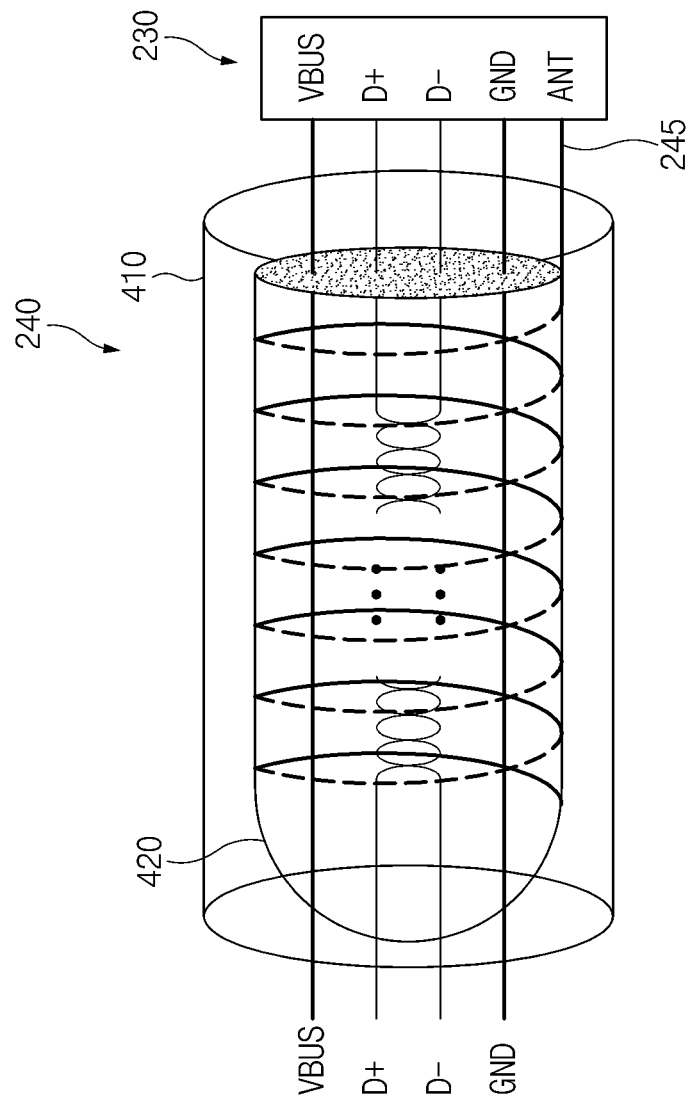
FIG. 4A illustrates a configuration of a cable including an antenna line between a shield unit (or a shield) and a cable jacket according to various embodiments.

FIG. 4A illustrates a configuration of a cable including an antenna line between a shielding unit and a cable jacket according to various embodiments. FIG. 4A shows an example in which the cable 240 and the connector 230 include VBUS, D+, D−, GND, and antenna pins. However, the type and number of pins illustrated in FIG. 4A is not limited. The embodiment in which other pins of the USB C-TYPE described in FIG. 3 are included may be applied identically.

Referring to FIG. 4A, the cable 240 may include a plurality of lines connected to the VBUS pin, D+ pin, D− pin, GND pin, and antenna pin of the connector 230. According to an embodiment, the antenna pin may include GND pin, TX+ pin, TX− pin, SBU pin, RX− pin, or RX+ pin other than the GND pin illustrated in FIG. 4A among the two GND pins.

According to an embodiment, the cable 240 may include a shielding unit 420 surrounding the outer surfaces of a plurality of lines to prevent noise components (e.g., DMI) between the plurality of lines. According to an embodiment, the cable 240 may include a jacket 410 on the exterior appearance of the shielding unit 420 to protect the shielding unit 420 and the plurality of lines from the outside.

According to an embodiment, the antenna line 245 connected to the antenna pin may be interposed between the outside of the shielding unit 420 and the inside of the jacket 410. For example, the antenna line 245 may be formed to surround the shielding unit 420 in the form of a screw. Because the antenna line 245 is disposed outside the shielding unit 420, the connector 230 of the external device 202 may protect the antenna line 245 from noise components occurring among different lines and may stably deliver a broadcast signal to the electronic device 201. For example, the material of the antenna line 245 may include copper, aluminum, or tin.

According to an embodiment, the length of the antenna line 245 may be determined based on the wavelength of the broadcast signal. For example, the wavelength of the broadcast signal may be expressed as Equation 1 below.

$$\lambda = \frac{c}{f} \quad \text{[Equation 1]}$$

In Equation 1, 'λ,' may refer to the length of the wavelength, 'f' to the frequency, and 'c' to the speed of light. The frequency of the FM signal may include 87.5 MHz to 108 MHz, and the frequency of a DMB signal may include 174 MHz to 230 MHz. The length of the antenna may correspond to ½ or ¼ of the wavelength 'λ,'; when a wavelength reduction rate (e.g., 0.9 to 0.95) is applied to the length of the antenna, the length of the antenna line 245 may be determined.

Figure 4B:
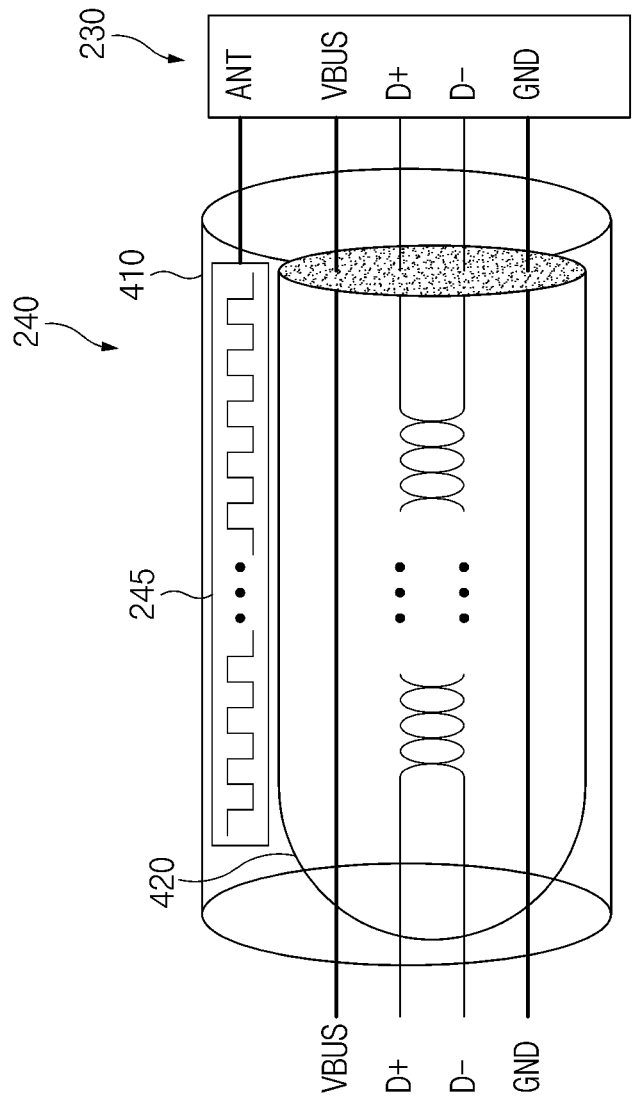
FIG. 4B illustrates a configuration of a cable including a printed circuit board (PCB) circuit according to various embodiments.

FIG. 4B illustrates a configuration of a cable including a printed circuit board (PCB) circuit according to various embodiments. FIG. 4B shows an example in which the cable 240 and the connector 230 include VBUS, D+, D−, GND, and antenna pins. However, the type and number of pins illustrated in FIG. 4B is not limited. The embodiment in which other pins of the USB C-TYPE described in FIG. 3 are included may be applied identically.

Referring to FIG. 4B, the cable 240 may include at least one pin of the USB C-TYPE of the connector 230 and an antenna pin. According to an embodiment, the cable 240 may include a shielding unit 420 surrounding the outer surfaces of a plurality of lines and the jacket 410 outside the shielding unit 420.

According to an embodiment, the antenna line 245 receiving the broadcast signal may be interposed between the outer surface of the shielding unit 420 and the jacket 410. The antenna line 245 may include a PCB circuit. For example, the PCB circuit may include a film-type flexible PCB circuit.

Figure 4C:
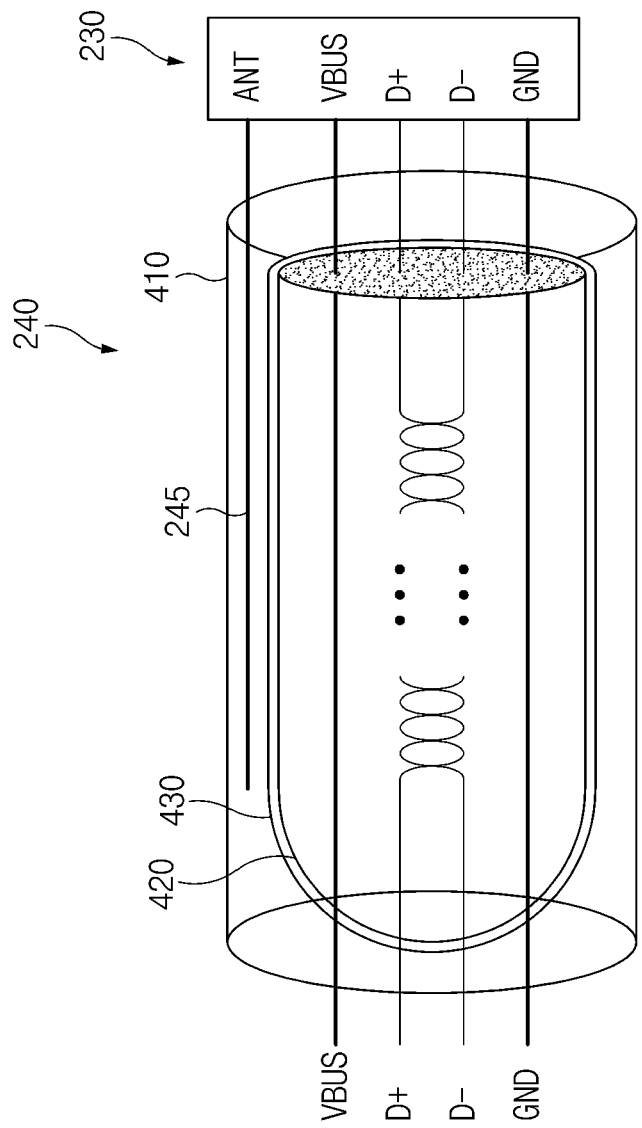
FIG. 4C illustrates a configuration of a cable including an insulator between an antenna line and a shielding unit according to various embodiments.
Figure 4D:
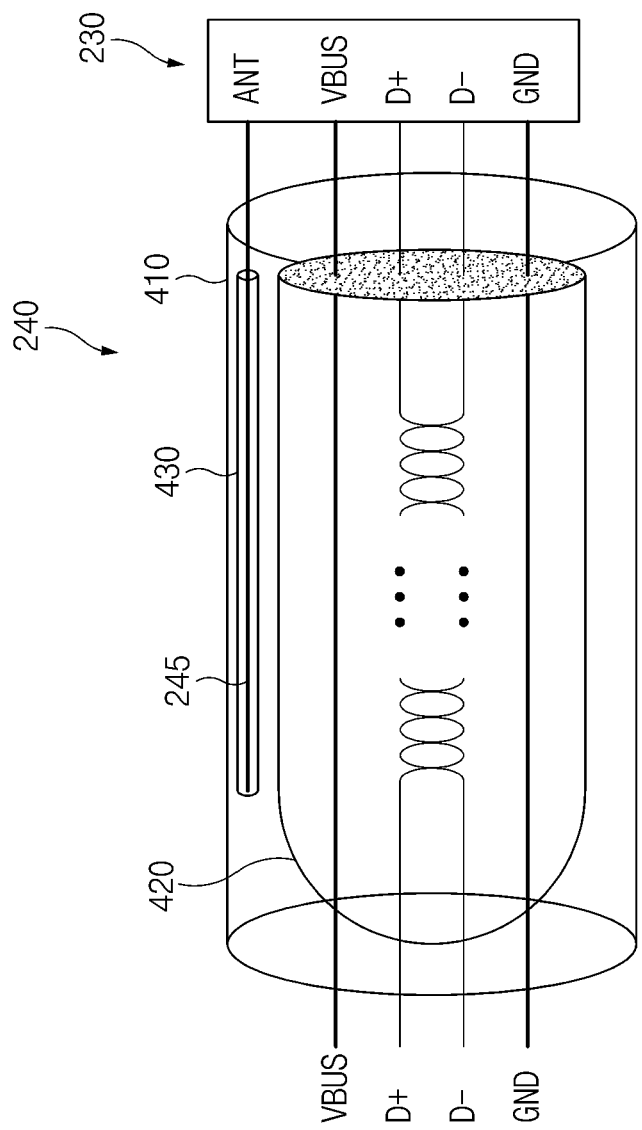
FIG. 4D illustrates a configuration of a cable including an insulator surrounding an antenna line according to various embodiments.

FIGS. 4C and 4D illustrate a configuration of a cable including an insulator according to various embodiments. FIGS. 4C and 4D illustrate an example in which the cable 240 and the connector 230 include VBUS, D+, D−, GND, and antenna pins. However, the type and number of pins illustrated in FIGS. 4C and 4D is not limited. The embodiment in which other pins of the USB C-TYPE described in FIG. 3 are included may be applied identically.

Referring to FIG. 4C, the cable 240 may include at least one pin of the USB C-TYPE of the connector 230 and an antenna pin. According to an embodiment, the cable 240 may include the shielding unit 420 surrounding the outer surfaces of a plurality of lines and the jacket 410 outside the shielding unit 420.

According to an embodiment, the antenna line 245 may be interposed between the outer surface of the shielding unit 420 and the jacket 410. For example, the antenna line 245 may be formed in a screw form surrounding the shielding unit 420 or may include a PCB circuit. When the antenna line 245 is formed in a screw form surrounding the shielding unit 420, the material and length of the antenna line 245 may be determined in the same method as the method described in FIG. 4A.

According to an embodiment, the cable 240 may include an insulator 430 to prevent signal connection between the antenna line 245 and the shielding unit 420. The insulator 430 may be formed in a form surrounding the shielding unit 420 as illustrated in FIG. 4C or may be formed in a form surrounding the antenna line 245 as illustrated in FIG. 4D.

Figure 4E:
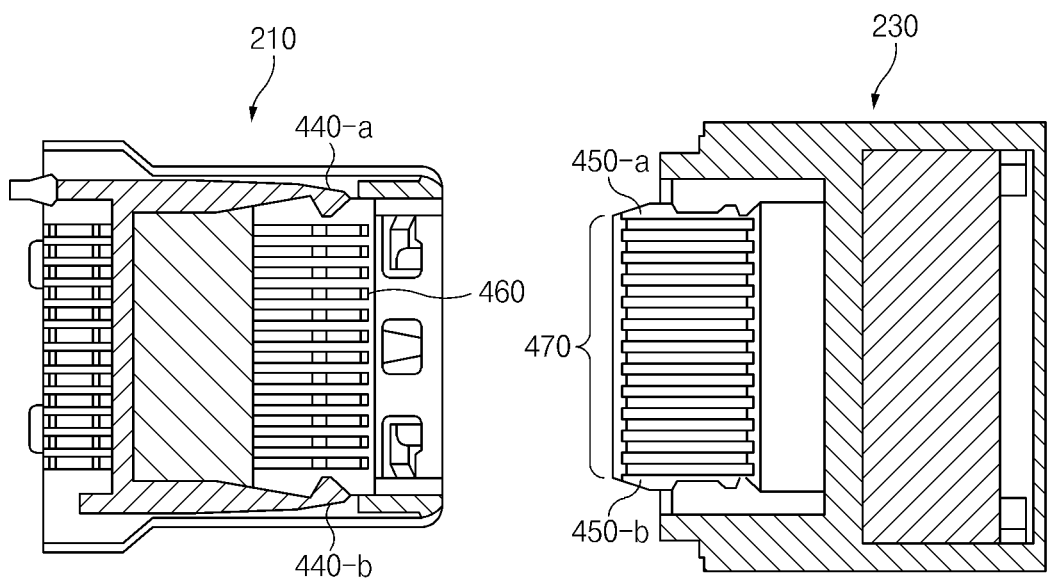
FIG. 4E illustrates a configuration of a cable including a latch pin according to various embodiments.

FIG. 4E illustrates a configuration of a cable including a latch pin according to various embodiments. FIG. 4E may mean a view of the connector 210 of the electronic device 201 and the connector 230 of the external device 202 when viewed from the top or bottom.

Referring to FIG. 4E, the connector 210 of the electronic device 201 may include two latch pins 440-a and 440-b in addition to a USB C-TYPE pin 460 (e.g., pins 310-1, 310-2, . . . , and 310-12 of FIG. 3 or pins 320-1, 320-2, . . . , and 320-12). According to an embodiment, the connector 230 of the external device 202 may include two latch pins 450-a and 450-b in addition to a USB C-TYPE pin 470 (e.g., pins 330-1, 330-2, . . . , and 330-12 of FIG. 3 or pins 340-1, 340-2, . . . , and 340-12). The latch pin may be formed in a structure in which the connector 210 of the electronic device 201 and the connector 230 of the external device 202 are capable of being fixed. For example, when the connector 230 of the external device 202 is inserted into the connector 210 of the electronic device 201, the latch pins 440-a and latch pins 450-a are engaged with each other and the latch pin 440-b and the latch pin 450-b may be engaged with each other.

According to an embodiment, the latch pin may be formed to perform a function of transmitting a broadcast signal in addition to a function of fixing a physical bonding between connectors. According to an embodiment, the electronic device 201 and the external device 202 may use one latch pin among two latch pins as an antenna pin. For example, the external device 202 may receive a broadcast signal through the latch pin 450-a or 450-b, and the electronic device 201 may receive a broadcast signal from the external device 202 through the latch pin 440-a or 440-b.

Figure 5:
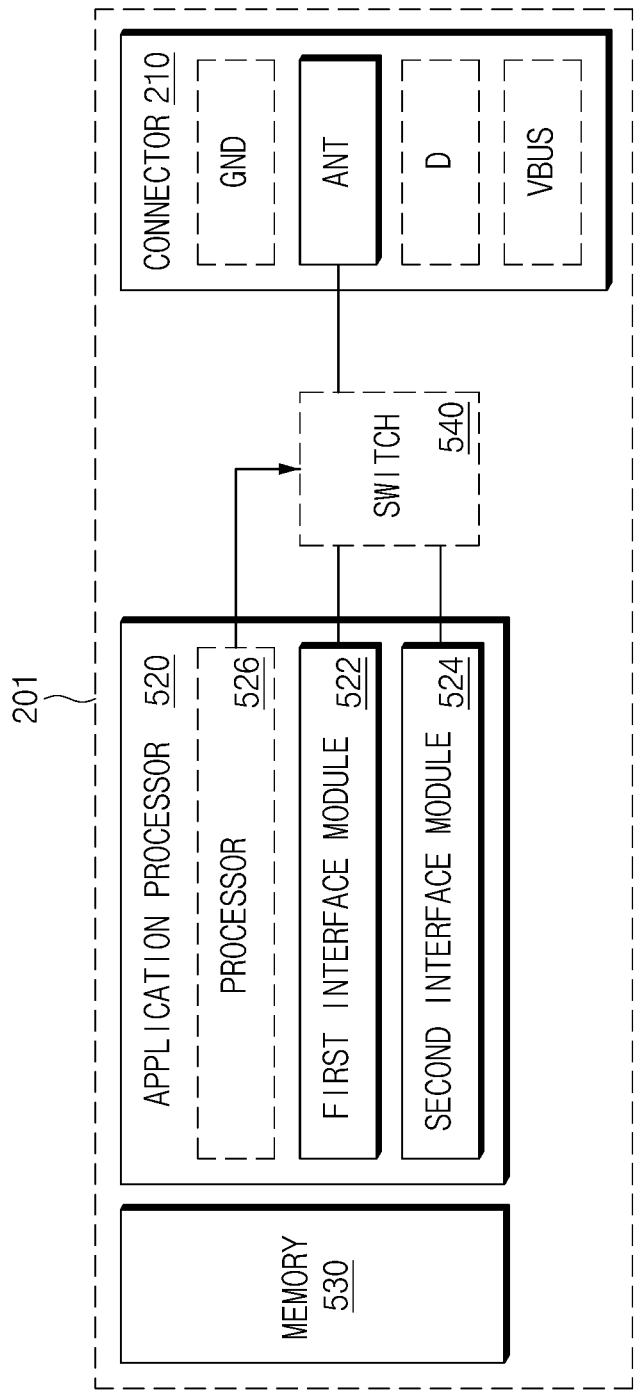
FIG. 5 illustrates a configuration of an electronic device including a first interface module and a second interface module according to various embodiments.

FIG. 5 illustrates a configuration of an electronic device including a first interface module and a second interface module according to various embodiments.

Referring to FIG. 5, the electronic device 201 may include the connector 210, an application processor 520 (e.g., the processor 120 in FIG. 1), a memory 530 (e.g., the memory 130 in FIG. 1), and a switch 540. The electronic device 201 may further include other components not illustrated FIG. 5 or may omit at least one of the components illustrated in FIG. 5. For example, the electronic device 201 may further include at least one of the components illustrated in FIG. 1 (e.g., the audio module 170 of FIG. 1). For another example, the electronic device 201 may not include at least one of an application processor 520 or a processor 526.

According to an embodiment, the application processor 520 may include a first interface module 522, a second interface module 524, and the processor 526. Although not illustrated in FIG. 5, the application processor 520 may further include a software-type or hardware-type module to process a data loaded from the memory 530 or a voice signal generated from an audio module.

According to an embodiment, the first interface module 522 may perform an operation in a legacy mode. In the legacy mode, the first interface module 522 may process a signal associated with a DP protocol, a voice signal, or a signal associated with moisture recognition. According to an embodiment, the first interface module 522 may be connected to an antenna pin (e.g., the SBU pin) among the pins of the connector 210.

According to an embodiment, the second interface module 524 may perform an operation in a broadcast mode. In the broadcast mode, the second interface module 524 may process the broadcast signal. According to an embodiment, the second interface module 524 may be connected to an antenna pin (e.g., the SBU pin) among the pins of the connector 210.

According to an embodiment, the first interface module 522 and the second interface module 524 may include a physical transceiver (PHY) physically delivering a signal to the connector 210 or a controller controlling the PHY. Each of the PHYs may be connected via the connector 210 and lines.

According to an embodiment, the processor 526 may control the signal transmission of each of the interface modules. For example, the processor 526 may be a central processing unit (CPU) embedded in the application processor 520 separately from each of the interface modules. For another example, the processor 526 may be a controller embedded in at least one interface module among each of the interface modules. The processor 526 may be a hardware-type or software-type module.

According to an embodiment, the memory 530 may be a non-volatile memory or a volatile memory. When the memory 530 is a non-volatile memory, the memory 530 may be a flash memory. For example, the memory 530 may include an embedded multimedia card (eMMC), a universal flash storage (UFS), or a secure digital (SD) card. When the memory 530 is a volatile memory, the memory 530 may be a random access memory (RAM). According to an embodiment, the memory 530 may include a software driver used for each of the interface modules to convert data. According to an embodiment, the memory 530 may include instructions used for the processor 526 (or the application processor 520) to control data transmission of each of the interface modules. According to an embodiment, the memory 530 may include at least one operating system.

According to an embodiment, the switch 540 may be positioned between the connector 210 and the first and second interface module 522 and 524. The switch 540 may connect one interface module among the first interface module 522 and the second interface module 524 to the connector 210 under control of the processor 526. FIG. 5 illustrates the switch 540 in the analog form. However, the electronic device 201 does not include the switch 540, but may include a digital switch inside the application processor 520.

According to an embodiment, the processor 526 may switch an interface module based on whether the external device 202 supports an antenna function for a broadcast signal. For example, when an antenna pin is allocated to the SBU pin, the processor 526 may control the switch 540 such that the interface module connected to the SBU pin is changed from the first interface module 522 to the second interface module 524 to perform a broadcast function.

According to an embodiment, the first interface module 522 may be connected to the SBU pin, and the second interface module 524 may be connected to another USB C-TYPE pin other than the SBU pin. In other words, the antenna pin may be allocated to another pin other than the SBU pin. When the antenna pin is allocated to another pin other than the SBU pin, because the first interface module 522 and the second interface module 524 are independently connected to different pins, the electronic device 201 may not include the switch 540 for switching the interface module.

Figure 6:
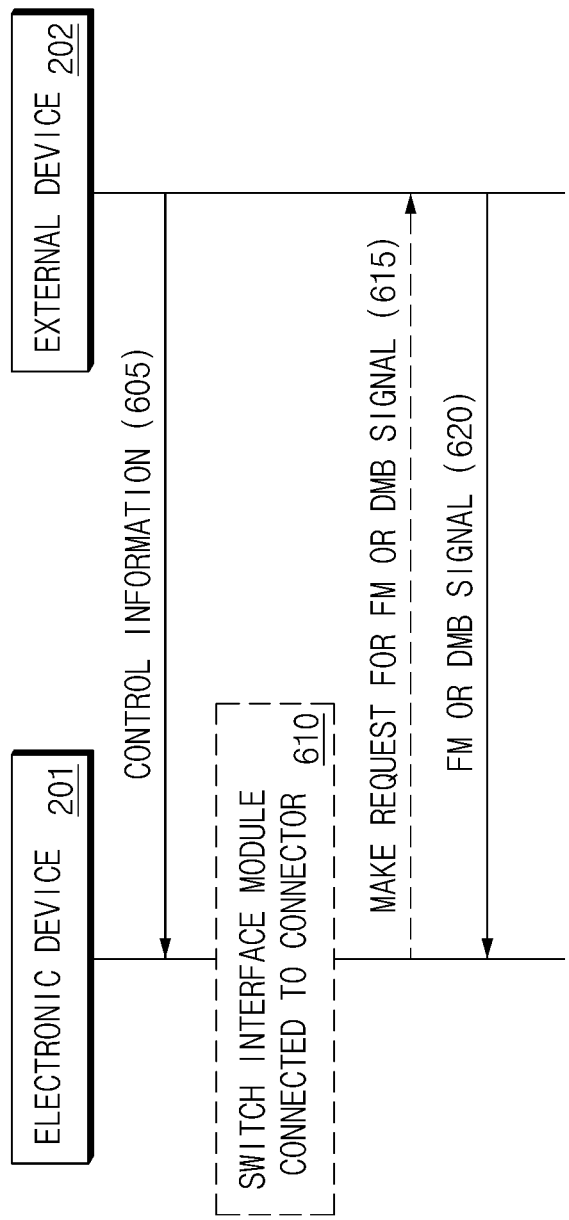
FIG. 6 illustrates a signal flowchart between an electronic device and an external device that transmit and receive broadcast signals according to various embodiments.

FIG. 6 illustrates a signal flowchart between an electronic device and an external device that transmit and receive broadcast signals according to various embodiments.

Referring to FIG. 6, in operation 605, the electronic device 201 may receive control information from the external device 202. For example, the control information may include information indicating whether the external device 202 supports an antenna function for a broadcast signal, information indicating that the external device 202 is connected to the connector 210 of the electronic device 201 through the connector 230, or information about a type (e.g., USB protocol or non-USB protocol) of protocol supported by the external device 202. According to an embodiment, the electronic device 201 may receive the control information from the external device 202 through a CC pin.

In operation 610, the electronic device 201 may switch the interface module connected to the connector 210 from the first interface module 522 to the second interface module 524 when the external device 202 performs an antenna function for a broadcast signal. According to an embodiment, the electronic device 201 may determine whether the external device 202 performs an antenna function, based on the control information. According to an embodiment, when the antenna pin is allocated to a pin other than the SBU pin, the electronic device 201 may implement operation 615 or operation 620 without switching the interface module.

In operation 620, the electronic device 201 may receive a broadcast signal from the external device 202. For example, the electronic device 201 may receive a broadcast signal through a pin allocated as an antenna pin among USB C-TYPE pins.

According to an embodiment, the electronic device 201 may make a request for the broadcast signal to the external device 202 in operation 615, before receiving the broadcast signal. For example, the electronic device 201 may transmit a request signal to the external device 202 through the CC pin.

Figure 7:
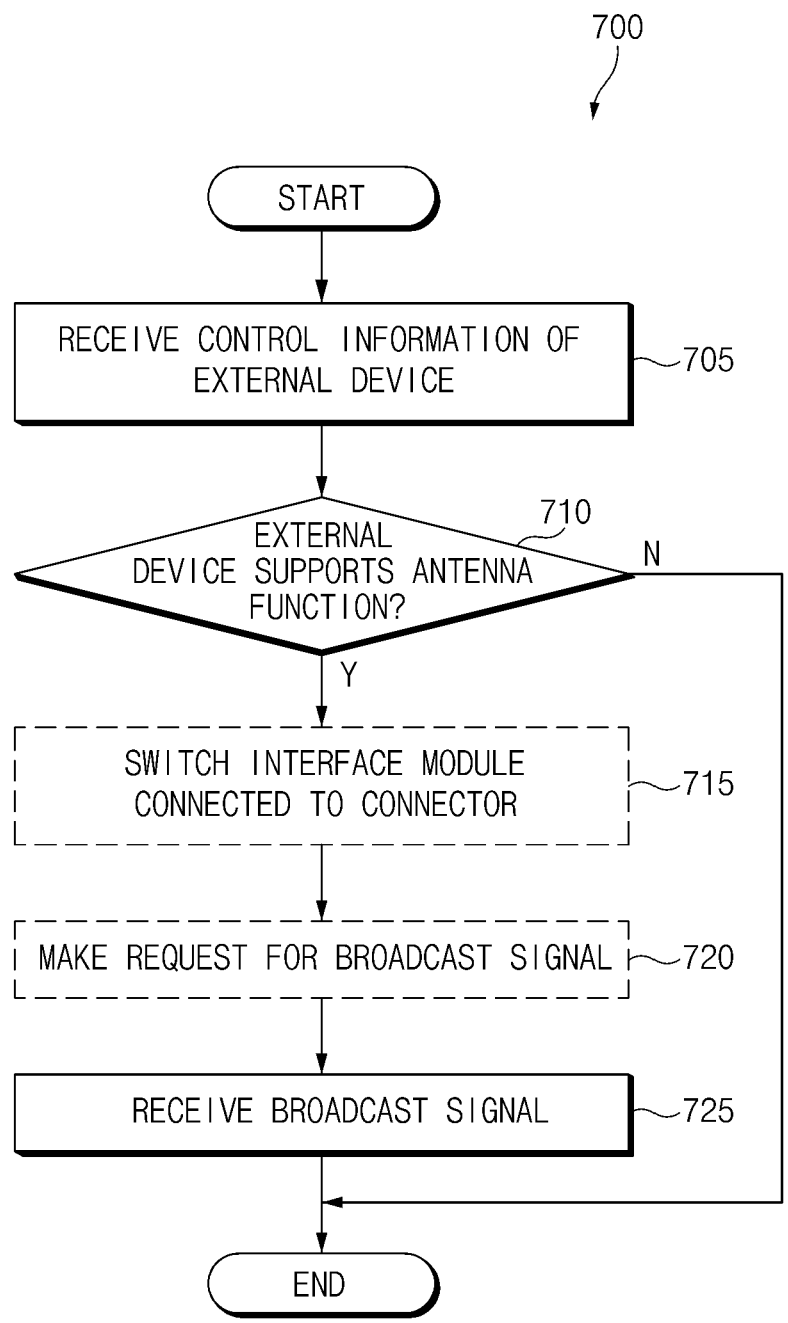
FIG. 7 is an operation flowchart of an electronic device that switches an interface module connected to a connector according to various embodiments.

FIG. 7 is an operation flowchart of an electronic device that switches an interface module connected to a connector according to various embodiments. The operations illustrated in FIG. 7 are implemented by the electronic device 201 or the processor 526; alternatively, when the instructions stored in the memory 530 are executed by the processor 526, the operations illustrated in FIG. 7 may be implemented.

Referring to FIG. 7, in operation 705 of a method 700, the electronic device 201 (e.g., the processor 526) may receive control information of the external device 202. For example, the control information may include information indicating whether the external device 202 supports an antenna function, information indicating that the external device 202 is connected to the connector 210 of the electronic device 201 through the connector 230, or information about a type of protocol supported by the external device 202.

In operation 710, the electronic device 201 may determine whether the external device 202 supports an antenna function, based on the received control information. When the external device 202 does not support the antenna function, the electronic device 201 may terminate an algorithm. When the external device 202 supports the antenna function, the electronic device 201 may implement operation 715.

In operation 715, the electronic device 201 may switch the interface module connected to the SBU pin of the connector 210 from the first interface module 522 to the second interface module 524. According to an embodiment, the electronic device 201 may switch the interface module by controlling an analog switch interposed between the interface modules and the connector 219 or by controlling a digital switch disposed inside the application processor 520. According to an embodiment, when the antenna pin is allocated to another pin (e.g., GND pin, TX+/− pin, or RX+/− pin) other than the SBU pin, the electronic device 201 may not implement operation 715 but may implement operation 720 or operation 725.

In operation 725, the electronic device 201 may receive a broadcast signal from the external device 202. According to an embodiment, the electronic device 201 may make a request for the broadcast signal to the external device 202 in operation 720, before receiving the broadcast signal.

As illustrated in the method 700, even though a broadcast antenna is not built inside the electronic device 201, the electronic device 201 may provide a broadcast service to a user by receiving data from the external device 202 supporting a broadcast antenna function through the USB C-TYPE connector 210.

Figure 8:
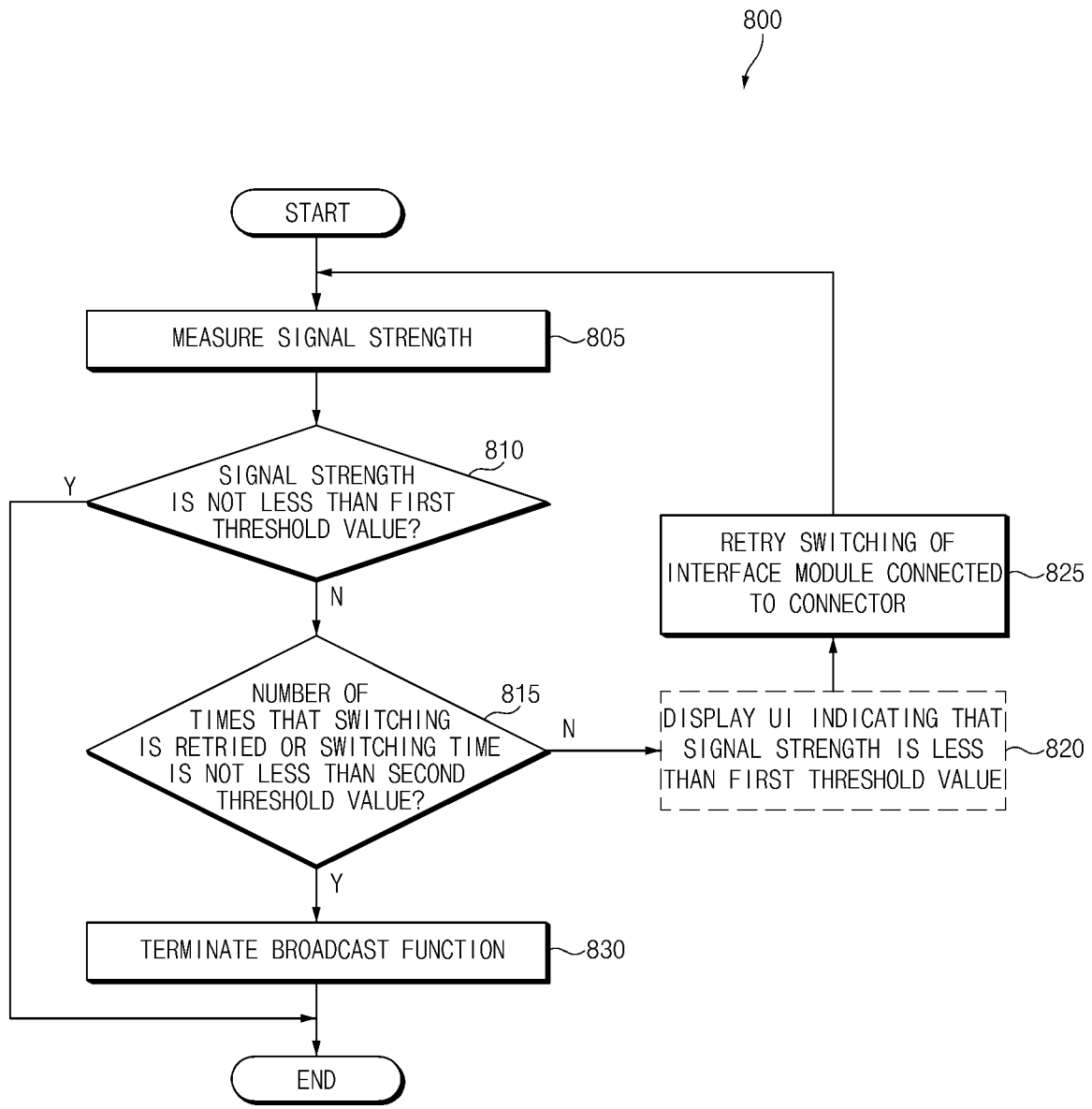
FIG. 8 is an operation flowchart of an electronic device controlling a switching operation of an interface module connected to a connector based on signal strength according to various embodiments.

FIG. 8 is an operation flowchart of an electronic device controlling a switching operation of an interface module connected to a connector based on signal strength according to various embodiments. The operations illustrated in FIG. 8 are implemented by the electronic device 201 or the processor 526; alternatively, when the instructions stored in the memory 530 are executed by the processor 526, the operations illustrated in FIG. 8 may be implemented. In FIG. 8, it may be assumed that the antenna line 245 of the external device 202 is allocated to the SBU pin of the connector 230.

Referring to FIG. 8, in operation 805 of a method 800, the electronic device 201 may measure the strength of a broadcast signal. For example, the signal strength may include signal to noise ratio (SNR), reference signals received power (RSRP), received signal code power (RSCP), or received signal strength indicator (RSSI).

In operation 810, the electronic device 201 may determine whether the measured strength of the signal is not less than a specified first threshold value. For example, the first threshold value may be stored in the memory 530. When the strength of the signal is not less than the first threshold value, the electronic device 201 may terminate the algorithm of the method 800. When the strength of the signal is less than the first threshold value, the electronic device 201 may implement operation 815.

In operation 815, the electronic device 201 may determine whether the number of times that switching is retried or the switching time is not less than a predetermined second threshold value. For example, the number of times that switching is retried may refer to the number of times that the electronic device 201 switches the interface module connected to the SBU pin of the connector 210 from the first interface module 522 to the second interface module 524. For another example, the switching time may refer to a time during which the electronic device 201 attempts to switch the interface module.

When the number of times that switching is retried or the switching time is less than the second threshold value, in operation 825, the electronic device 201 may retry the switching operation of the interface module connected to the connector 210. According to an embodiment, before the electronic device 201 retries the switching operation, in operation 820, the electronic device 201 may display a user interface (UI) indicating that the strength of the signal is less than the first threshold value, through a display (e.g., the display device 160 of FIG. 1).

When the number of times that switching is retried or the switching time is not less than the second threshold value, because the electronic device 201 does not normally receive a broadcast signal from the external device 202, in operation 830, the electronic device 201 may terminate the broadcast function.

As illustrated in the method 800, the electronic device 201 may control the switching operation of the interface module based on signal strength, thereby preventing the performance of a broadcast function from being degraded due to the switching operation of the interface module.

As described above, the electronic device (e.g., the external device 202 of FIG. 2) may include a connector (e.g., the connector 230 of FIG. 2) electrically connected to an external device (e.g., the electronic device 201 of FIG. 2) and including a first pin and a second pin and a cable (e.g., the cable 240 of FIG. 2) including a plurality of lines. the cable may include an antenna line (e.g., the antenna line 245 of FIG. 2) for receiving a broadcast signal among the plurality of lines, and the antenna line may be configured to be allocated to one pin among the first pin or the second pin.

According to an embodiment, the antenna line may be configured to be allocated to a ground (GND) pin among the first pin or the second pin.

According to an embodiment, the antenna line may be configured to be allocated to a transmission pin or a reception pin among the first pin or the second pin.

According to an embodiment, the antenna line may be configured to be allocated to a side band use (SBU) pin among the first pin or the second pin.

According to an embodiment, the antenna line may be configured to be interposed between an outer surface of a shielding unit configured to surround the pins and a jacket of the cable.

According to an embodiment, the antenna line may include a printed circuit board (PCB) antenna.

According to an embodiment, the antenna line may include a wire antenna.

According to an embodiment, the electronic device may further include a processor (e.g., the processor 120 of FIG. 1). The processor may be configured to transmit control information of the external device to the electronic device through the connector when the connector is connected to a connector of the electronic device, to receive a signal for making a request for the broadcast signal, from the electronic device, and to transmit the broadcast signal to the electronic device through the connector.

As described above, an electronic device (e.g., the electronic device 201 of FIG. 2) may include a connector (e.g., the connector 210 of FIG. 2) connected to an external device (e.g., the external device 202 of FIG. 2), a first interface module (e.g., the first interface module 522 of FIG. 5) processing a voice signal or a display port (DP) protocol-based signal, a second interface module (e.g., the second interface module 524 of FIG. 5) processing a broadcast signal, a processor (e.g., the processor 120 of FIG. 1, the application processor 520 of FIG. 5, or the processor 526 of FIG. 5), and a switch (e.g., the switch 540 of FIG. 5) positioned between the first and second interface modules and the connector. The processor may be configured to receive control information of the external device through the connector, identify that the external device supports an antenna function for the broadcast signal, based on the control information, to control the switch such that the connector is connected to the second interface module, and to receive the broadcast signal from the external device through the connector.

According to an embodiment, the connector may include a universal serial bus (USB) C-TYPE connector.

According to an embodiment, the second interface module may be configured to be connected to a GND pin among pins of the USB C-TYPE connector.

According to an embodiment, the second interface module may be configured to be connected to a transmission pin or a reception pin among pins of the USB C-TYPE connector.

According to an embodiment, the second interface module may be configured to be connected to a SBU pin among pins of the USB C-TYPE connector.

According to an embodiment, the processor may be configured to measure strength of the broadcast signal, to determine whether the number of times that switching is retried or a switching time is not less than a specified second threshold value when the strength of the signal is less than a specified first threshold value, and to control the switch such that the connector is connected to the second interface module when the number of times that the switching is retried or the switching time is less than the second threshold value.

According to an embodiment, the processor may be configured to measure strength of the broadcast signal, to determine whether the number of times that switching is retried or a switching time is not less than a specified second threshold value when the strength of the signal is less than a specified first threshold value, and to control the switch such that the connector is connected to the second interface module when the number of times that the switching is retried or the switching time is less than the second threshold value.

As described above, an electronic device (e.g., the electronic device 210 of FIG. 2) may include a USB C-TYPE connector (e.g., the connector 210 of FIG. 2) connected to an external device (e.g., the external device 202 of FIG. 2), a first interface module (e.g., the first interface module 522 of FIG. 5) processing a voice signal or a DP protocol-based signal, a second interface module (e.g., the second interface module 524 of FIG. 5) processing a broadcast signal, a processor (e.g., the processor 120 of FIG. 1, the application processor 520 of FIG. 5, or the processor 526 of FIG. 5), and a switch (e.g., the switch 5420 of FIG. 5) positioned between the first and second interface modules and the USB C-TYPE connector. The processor may be configured to receive control information of the external device through the USB C-TYPE connector, identify that the external device supports an antenna function for the broadcast signal, based on the control information, to control the switch such that the USB C-TYPE connector is connected to the second interface module, and to receive the broadcast signal from the external device through the USB C-TYPE connector.

According to an embodiment, the second interface module may be configured to be connected to a GND pin, a transmission pin, a reception pin, or a SBU pin among pins of the USB C-TYPE connector.

According to an embodiment, the processor may be configured to make a request for the broadcast signal to the external device through the USB C-TYPE connector.

According to an embodiment, the processor may be configured to measure strength of the broadcast signal, to determine whether the number of times that switching is retried or a switching time is not less than a specified second threshold value when the strength of the signal is less than a specified first threshold value, and to control the switch such that the USB C-TYPE connector is connected to the second interface module when the number of times that the switching is retried or the switching time is less than the second threshold value.

According to an embodiment, the processor may be configured to measure strength of the broadcast signal, to determine whether the number of times that switching is retried or a switching time is not less than a specified second threshold value when the strength of the signal is less than a specified first threshold value, and to control the switch such that the connector is connected to the second interface module when the number of times that the switching is retried or the switching time is less than the second threshold value.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor(e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a connector configured to be electrically connected to an external device and including a first pin, a second pin, and a latch pin, the latch pin configured to physically couple the connector and a connector of the external device; and
a cable including a plurality of lines, comprising a first line allocated to the first pin, a second line allocated to the second pin, and an antenna line allocated to the latch pin,
wherein the antenna line is configured to receive a broadcast signal, and wherein the latch pin is configured to transmit the received broadcast signal to the external device, and
wherein a shielding unit surrounds the first line and the second line, and wherein the antenna line is outside the shielding unit, and wherein a jacket surrounds the antenna line and the shielding unit and wherein an insulation layer is interposed between the antenna line and the shielding unit.

2. The electronic device of claim 1, wherein the antenna line includes a printed circuit board (PCB) antenna.

3. The electronic device of claim 1, wherein the antenna line includes a wire antenna.

4. The electronic device of claim 1, further comprising:
a processor,
wherein the processor is configured to:
when the connector of the electronic device is connected to the connector of the external device, receive control information of the external device from the external device through the connector of the electronic device;
transmit a signal for making a request for the broadcast signal, to the external device; and
receive the broadcast signal from the external device through the connector of the electronic device.

5. An electronic device comprising:
a connector configured to be connected to an external device;
a first interface module configured to process a voice signal or a display port (DP) protocol-based signal;
a second interface module configured to process a broadcast signal;
a processor; and
a switch positioned between the first and second interface modules and the connector,
wherein the processor is configured to:
receive control information of the external device through the connector;
identify that the external device supports an antenna function for the broadcast signal, based on the control information;
control the switch such that the connector is connected to the second interface module;
receive the broadcast signal from the external device through the connector;
detect strength of the broadcast signal;
when the detected strength of the broadcast signal is less than a first designated value, determine whether a number of times that switching between the first interface module and the second interface module is retried or a switching time between the first interface module and the second interface module is not less than a second designated value; and
when the number of times that switching is retried or the switching time is less than the second designated value, control the switch such that the connector is connected to the second interface module, or when the number of times that switching is retried or the switching time is not less than the second designated value, control a broadcast function to be terminated.

6. The electronic device of claim 5, wherein the connector includes a universal serial bus (USB)C-TYPE connector.

7. The electronic device of claim 6, wherein the second interface module is configured to be connected to a GND pin among pins of the USB C-TYPE connector.

8. The electronic device of claim 6, wherein the second interface module is configured to be connected to a transmission pin or a reception pin among pins of the USB C-TYPE connector.

9. The electronic device of claim 6, wherein the second interface module is configured to be connected to a SBU pin among pins of the USB C-TYPE connector.

* * * * *